(12) United States Patent
Feiler et al.

(10) Patent No.: US 7,217,803 B2
(45) Date of Patent: May 15, 2007

(54) BENZIMIDAZOLE-PYRIDONE-BASED AZO DYES

(75) Inventors: Leonhard Feiler, Binzen (DE);
Thomas Raimann, Sisseln (CH);
Thomas Eichenberger, Basel (CH);
Max Hügin, Rünenberg (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 48 days.

(21) Appl. No.: 10/537,063

(22) PCT Filed: Nov. 26, 2003

(86) PCT No.: PCT/EP03/50898

§ 371 (c)(1),
(2), (4) Date: Jun. 1, 2005

(87) PCT Pub. No.: WO2004/050768

PCT Pub. Date: Jun. 17, 2004

(65) Prior Publication Data

US 2006/0053571 A1 Mar. 16, 2006

(30) Foreign Application Priority Data

Dec. 5, 2002 (CH) ..................................... 2058/02

(51) Int. Cl.
*C09B 31/14* (2006.01)
*C09B 29/36* (2006.01)
*C09B 69/04* (2006.01)
*D06P 3/60* (2006.01)

(52) U.S. Cl. .............................. 534/752; 8/402; 8/681; 8/682; 8/683; 8/684; 8/922; 524/93

(58) Field of Classification Search ................ 534/752; 8/402, 681–684, 922; 524/93
See application file for complete search history.

(56) References Cited

U.S. PATENT DOCUMENTS 4,012,371 A * 3/1977 Roueche et al. ............ 534/752

FOREIGN PATENT DOCUMENTS

DE 2004488 8/1971
DE 2023295 11/1971
DE 2701659 7/1978

OTHER PUBLICATIONS

D.V. Dikshit et al. "Synthesis of Isomeric Azo Disperse Dyes of Pyridobenzimidazole" Dyes and Pigments, vol. 6, No. 2 (1985) pp. 99-106=XP 002280475.
Derwent Abstract 1971-51969S[32] of DE 2004488.
Derwent Abstract 1971-75484S[48] of DE 2023295.
Derwent Abstract 1978-53713A [30] of DE 2701659.

* cited by examiner

*Primary Examiner*—Fiona T. Powers
(74) *Attorney, Agent, or Firm*—Joseph C. Suhadolnik

(57) ABSTRACT

The present invention relates to azo dyes of formula (1) which are soluble in organic solvents, wherein $R_1$ is —CN, —COOR$_5$, —CONR$_6$R$_7$ or a heterocyclic ring, $R_2$ is unsubstituted or substituted alkyl, unsubstituted or substituted aryl, —CF$_3$, —COOR$_5$, —CONR$_6$R$_7$ or —COR$_5$, $R_3$ is hydrogen, —SO$_3$M, alkyl, alkoxy, alkylcarbonyl, —NO$_2$ or halogen, $R_4$ is substituted aryl, substituted heteroaryl or an aryl-N=N-aryl radical, wherein one or both of the aryl radicals in aryl-N=N-aryl is/are unsubstituted or substituted, or a radical heteroaryl-N=N-heteroaryl, wherein one or both of the heteroaryl radicals in heteroaryl-N=N-heteroaryl is/are unsubstituted or substituted, $R_5$ is hydrogen, alkyl or unsubstituted or substituted aryl, $R_6$ is hydrogen, alkyl or unsubstituted or substituted aryl, $R_7$ is hydrogen, alkyl or unsubstituted or substituted aryl, $M^+$ is a cation, n is a number 1, 2 or 3 and m is a number 1, 2 or 3, to a process for the preparation thereof and to the use thereof in the production of colored plastics or polymeric color particles, and as printing inks, printing dyes, coating compositions and wood stains

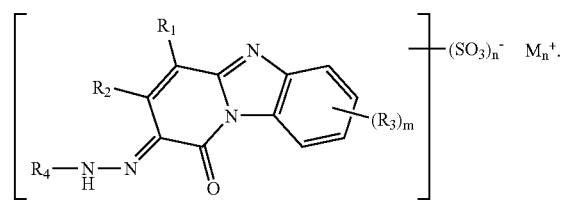

(1)

20 Claims, No Drawings

BENZIMIDAZOLE-PYRIDONE-BASED AZO DYES

The present invention relates to benzimidazole-pyridone-based azo dyes that are soluble in organic solvents, to a process for their preparation and to their use in the production of coloured plastics or polymeric colour particles, and also as printing inks, printing dyes, coating compositions and wood stains.

DE-A-2 004 488 discloses water-soluble azo dyes which are used in the dyeing of textile materials. However, those dyes are not soluble in organic solvents.

DE-A-2 023 295 further discloses water-soluble azo dyes without a sulfo group, which are used in the dyeing of textile material and plastics or as pigments.

The object of the present invention is to provide compounds having good fastness to light which are very readily soluble in organic solvents and can be used, for example, as soluble printing inks and wood stains and in the colouring of polar plastics, and which are only sparingly soluble in water. This cannot be achieved with the compounds known today.

It has now been found, surprisingly, that the azo dyes according to the invention, which are in the form of an ammonium salt containing aliphatic or aromatic substituents or in the form of a phosphonium salt, achieve the above-mentioned object to a substantial degree.

Accordingly, the present invention relates to azo dyes of formula $$\left[ \begin{array}{c} R_1 \\ R_2 \\ R_4-N-N \\ H \end{array} \text{benzimidazole-pyridone structure} (R_3)_m \right] -(SO_3)_n^- \quad M_n^+, \tag{1}$$

wherein
$R_1$ is —CN, —COOR$_5$, —CONR$_6$R$_7$ or a heterocyclic ring,
$R_2$ is unsubstituted or substituted alkyl, unsubstituted or substituted aryl, —CF$_3$, —COORS, —CONR$_6$R$_7$ or —COR$_5$,
$R_3$ is hydrogen, —SO$_3$M, alkyl, alkoxy, alkylcarbonyl, —NO$_2$ or halogen,
$R_4$ is substituted aryl, substituted heteroaryl or an aryl-N=N-aryl radical, wherein one or both of the aryl radicals in aryl-N=N-aryl is/are unsubstituted or substituted, or a radical heteroaryl-N=N-heteroaryl, wherein one or both of the heteroaryl radicals in heteroaryl-N=N-heteroaryl is/are unsubstituted or substituted,
$R_5$ is hydrogen, alkyl or unsubstituted or substituted aryl,
$R_6$ is hydrogen, alkyl or unsubstituted or substituted aryl,
$R_7$ is hydrogen, alkyl or unsubstituted or substituted aryl,
$M^+$ is a cation,
n is a number 1, 2 or 3 and
m is a number 1, 2 or 3.

$R_1$ as a heterocyclic ring is, for example, a heterocyclic ring of the thiophene, furan, benzofuran, imidazole, pyrazole, pyridine, pyrazine, quinoline, indole, thiazole, indoline, morpholine, pyrrolidine, piperidine and piperazine series.

$R_2$ as alkyl is preferably $C_1$–$C_6$alkyl, for example methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, as well as the associated isomers, which may be unsubstituted or substituted by alkoxy, hydroxy and/or by carbonyl.

$R_2$ as substituted $C_1$–$C_6$alkyl is especially $C_1$–$C_6$alkyl substituted by $C_1$–$C_4$alkoxy and/or by hydroxy.

$R_2$ as aryl is preferably phenyl, which may be unsubstituted or substituted by alkyl, alkoxy, carbonyl, halogen, hydroxy, amino, sulfo, sulfamido, nitro, cyano and/or by —CF$_3$, or naphthyl, which may be unsubstituted or substituted by alkyl, alkoxy, carbonyl, halogen, hydroxy, amino, sulfo, sulfamido, nitro, cyano and/or by —CF$_3$.

$R_2$ as substituted phenyl is especially phenyl substituted by $C_1$–$C_4$alkoxy, halogen, nitro and/or by sulfo, more especially phenyl substituted by $C_1$–$C_4$alkoxy and/or by chlorine.

$R_2$ as substituted naphthyl is especially naphthyl substituted by $C_{1-4}$alkoxy, halogen, nitro and/or by sulfo, more especially naphthyl substituted by $C_1$–$C_4$alkoxy and/or by chlorine.

$R_3$ as alkyl is preferably $C_1$–$C_6$alkyl, for example methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, as well as the associated isomers.

$R_3$ as alkoxy is preferably $C_1$–$C_4$alkoxy, for example methoxy, ethoxy, straight-chained or branched propoxy or straight-chained or branched butoxy.

$R_3$ as alkylcarbonyl is preferably $C_{1-4}$alkylcarbonyl, for example methylcarbonyl, ethyl-carbonyl, propylcarbonyl or butylcarbonyl.

$R_3$ as halogen is chlorine, bromine or iodine.

$R_4$ as substituted aryl is preferably phenyl, which may be unsubstituted or substituted by alkyl, alkoxy, carbonyl, halogen, hydroxy, amino, alkylamino, acetylamino, sulfo, sulfamido, nitro, cyano and/or by —CF$_3$, or naphthyl, which may be unsubstituted or substituted by alkyl, alkoxy, carbonyl, halogen, hydroxy, amino, alkylamino, acetylamino, sulfo, sulfamido, nitro, cyano and/or by —CF$_3$.

$R_4$ as substituted phenyl is especially phenyl substituted by $C_1$–$C_4$alkyl, $C_1$–$C_4$alkoxy, halogen, nitro, —CF$_3$ and/or by sulfo, more especially phenyl substituted by $C_1$–$C_4$alkoxy and/or by chlorine.

$R_4$ as substituted naphthyl is especially naphthyl substituted by $C_1$–$C_4$alkyl, $C_1$–$C_4$alkoxy, halogen, nitro and/or by sulfo, more especially naphthyl substituted by $C_1$–$C_4$alkoxy and/or by chlorine.

$R_4$ as heteroaryl is, for example, a heteroaryl of the thiophene, furan, benzofuran, imidazole, pyrazole, pyridine, pyrazine, quinoline, indole, thiazole, indoline, morpholine, pyrrolidine, piperidine and piperazine series, each of which may be substituted by hydroxy, cyano and/or by nitro.

The definitions and preferred meanings given above for aryl apply in respect of the aryl radicals in aryl-N=N-aryl in the definition of $R_4$.

The aryl radicals in aryl-N=N-aryl in the definition of $R_4$ may be substituted, for example, by methyl, methoxy, —NO$_2$, —CF$_3$ and/or one or more times by —SO$_3$M.

The definitions and preferred meanings given above for heteroaryl apply in respect of the heteroaryl radicals in heteroaryl-N=N-heteroaryl in the definition of $R_4$.

The heteroaryl radicals in heteroaryl-N=N-heteroaryl in the definition of $R_4$ may be substituted, for example, by methyl, methoxy, —NO$_2$, —CF$_3$ and/or one or more times by —SO$_3$M.

$R_5$ as alkyl is preferably $C_1$–$C_6$alkyl, for example methyl, ethyl, propyl, isopropyl, n-butyl, isobutyl, secutyl, tertbutyl, amyl, tert-amyl (1,1-dimethylpropyl), 1,1,3,3-tetramethylbutyl, hexyl, 1-methylpentyl, neopentyl, cyclopentyl, cyclohexyl, as well as the associated isomers.

$R_5$ as aryl is preferably phenyl, which may be unsubstituted or substituted by alkyl, alkoxy, carbonyl, halogen, hydroxy, amino, sulfo, sulfamide, nitro, cyano and/or by —$CF_3$, or naphthyl, which may be unsubstituted or substituted by alkyl, alkoxy, carbonyl, halogen, hydroxy, amino, sulfo, sulfamide, nitro, cyano and/or by —$CF_3$.

$R_5$ as substituted phenyl is especially phenyl substituted by $C_1$–$C_4$alkoxy, halogen, nitro and/or by sulfo, more especially phenyl substituted by $C_1$–$C_4$alkoxy and/or by chlorine.

$R_5$ as substituted naphthyl is especially naphthyl substituted by $C_1$–$C_4$alkoxy, halogen, nitro and/or by sulfo, more especially naphthyl substituted by $C_1$–$C_4$alkoxy and/or by chlorine.

$R_6$ as alkyl is preferably $C_1$–$C_6$alkyl, for example methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, as well as the associated isomers.

$R_6$ as aryl is preferably phenyl, which may be unsubstituted or substituted by alkyl, alkoxy and/or by sulfo, or naphthyl, which may be unsubstituted or substituted by alkyl, alkoxy and/or by sulfo.

$R_6$ as substituted phenyl is especially phenyl substituted by $C_1$–$C_4$alkyl, $C_1$–$C_4$alkoxy and/or by sulfo.

$R_6$ as substituted naphthyl is especially naphthyl substituted by $C_1$–$C_4$alkyl, $C_1$–$C_4$alkoxy and/or by sulfo.

$R_7$ as alkyl is preferably $C_1$–$C_6$alkyl, for example methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, as well as the associated isomers.

$R_7$ as aryl is preferably phenyl, which may be unsubstituted or substituted by alkyl, alkoxy and/or by sulfo, or naphthyl, which may be unsubstituted or substituted by alkyl, alkoxy and/or by sulfo.

$R_7$ as substituted phenyl is especially phenyl substituted by $C_1$–$C_4$alkyl, $C_1$–$C_4$alkoxy and/or by sulfo.

$R_7$ as substituted naphthyl is especially naphthyl substituted by $C_1$–$C_4$alkyl, $C_1$–$C_4$alkoxy and/or by sulfo.

The cation $M^+$ is, for example, $Na^+$, $K^+$, $½Mg^{2+}$, $½Ca^{2+}$, 18 crown 6 $Na^+$ (a compound of the formula

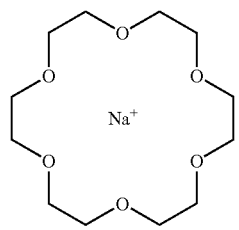

) or $N(R_8)_4^+$, wherein the substituents $R_8$ are each independently of the others hydrogen, $C_1$–$C_{16}$alkyl or $C_1$–$C_4$ alcohol.

The cation $N(R_8)_4^+$ is, for example, $NH_4$, a quaternised or protonated Primene 81 (Primene 81 is the commercial name of a $C_{12}$–$C_{14}$ primary amine from Rohm & Haas), $N^+[(CH_2)CH_3]_4$, $N^+(C_{16}H_{33})(CH_3)_3$ or $N^+(C_{10}H_{21})_2(CH_3)_2$, or also a phosphonium salt.

When n is a number 2 or 3, the cations $M^+$ can be the same or different.

$R_8$ as $C_1$–$C_{16}$alkyl is, for example, methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methyl-pentyl, neopentyl, cyclopentyl, cyclohexyl, heptyl, octyl, nonyl, decyl, undecyl, dodecyl, tetradecyl, hexadecyl, as well as associated isomers.

$R_1$ is preferably —CN or —$CONH_2$.

$R_2$ is preferably methyl, isopropyl, —$CF_3$, phenyl or p-methoxyphenyl.

$R_3$ is preferably hydrogen, chlorine or —$SO_3M$.

Preferably, $R_4$ is phenyl substituted by methyl and/or by methoxy and/or by —$NO_2$ and/or by —$CF_3$ and/or one or more times by —$SO_3M$, or is phenyl-N=N-phenyl, wherein one of the phenyl radicals or both phenyl radicals independently of one another is/are unsubstituted or substituted as indicated above.

Also preferred as $R_4$ is naphthyl substituted one or more times by —$SO_3M$.

Preferred as the cation are Primene 81, $N^+[(CH_2)_3CH_3]$, $N^+(C_{16}H_{33})(CH_3)_3$ and $N^+(C_{10}H_{21})_2(CH_3)_2$.

Especially preferred azo dyes of formula (1) are the compounds of formulae

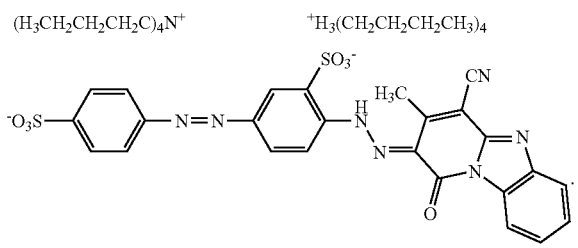

(10)

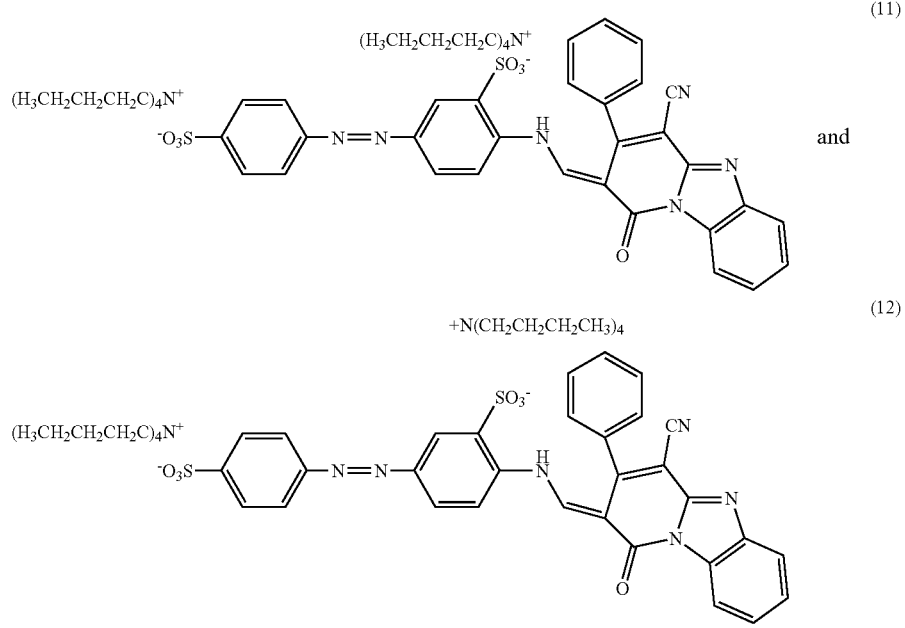

The present invention relates also to the preparation of the azo dyes of formula (1).

The azo dyes of formula (1) can be prepared according to processes known per se. They are obtained, for example, as follows: a compound of formula $$R_4\text{—}NH_2 \quad (50)$$

is diazotised and coupled to a coupling component of formula

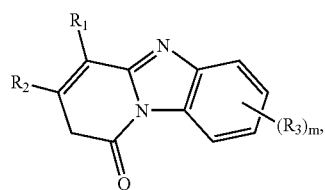

wherein $R_1$, $R_2$, $R_3$, $R_4$ and m are as defined for formula (1), the diazo component and/or the coupling component containing at least one sulfo group, which is subsequently neutralised with a suitable base containing the cation $M^+$.

That cation $M^+$ can optionally be replaced by other cations.

The diazotisation of the compounds of formula (50) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. using nitrosylsulfuric acid or tert-butyl nitrite. In the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., preferably from −10° C. to room temperature.

The coupling of the diazotised compound of formula (50) to the coupling component of formula (51) is likewise effected in known manner, for example in an acidic, aqueous or aqueous-organic, medium, advantageously at temperatures of from −10 to 30° C., especially below 10° C. Examples of acids used are hydrochloric acid, acetic acid, sulfuric acid and phosphoric acid. The diazotisation and the coupling can, for example, be carried out in the same reaction medium.

Some of the diazo components of formula (50) and the coupling components of formula (51) are known, or they can be prepared in a manner known per se, for example according to a process from DE-A-2 004 488.

The organic solvents in which the azo dyes according to the invention are soluble are, for example, linear, branched or cyclic alcohols, linear, branched or cyclic ketones, carboxylic acid esters, toluene and xylene.

The azo dyes according to the invention are very readily soluble especially in polar solvents, more especially in methanol, ethanol, ethyl acetate, butyl acetate and isobutyl methyl ketone.

The present invention relates also to a process for the production of coloured plastics or polymeric colour particles, which comprises mixing together a high molecular weight organic material and a tinctorially effective amount of at least one azo dye of formula (1).

The colouring of high molecular weight organic substances with the azo dye of formula (1) is carried out, for example, by mixing such an azo dye into those substrates using roll mills, mixing apparatus or grinding apparatus, with the result that the azo dye is dissolved or finely dispersed in the high molecular weight material. The high molecular weight organic material with the admixed azo dye is then processed using processes known per se, for example calendering, compression moulding, extrusion, coating, spinning, casting or injection moulding, whereby the coloured material acquires its final form. It is also possible for the admixing of the azo dye to be carried out immediately prior to the actual processing step, by continuously feeding a solid azo dye (for example in powder form) and, at the same time, a granulated or pulverulent high molecular weight organic material, and optionally also additional ingredients, e.g. additives, directly into the intake zone of an extruder, where mixing takes place just before processing. In general, however, it is preferable for the azo dye to be mixed into the high molecular weight organic material beforehand, because more even colouration of the substrates can be obtained.

It is often desirable, in order to produce non-rigid mouldings or to reduce their brittleness, to incorporate so-called plasticisers into the high molecular weight compounds prior to shaping. There may be used as plasticisers, for example, esters of phosphoric acid, phthalic acid or sebacic acid. In the process according to the invention the plasticisers may be incorporated into the polymers before or after the incorporation of the colorant. It is also possible, in order to achieve different shades of colour, to add to the high molecular weight organic materials, in addition to the azo dye of formula (1), also further azo dyes or other colorants in any desired amounts, optionally together with further additives, e.g. fillers or siccatives.

Preference is given to the colouring of thermoplastic plastics, especially in the form of fibres.

Preferred high molecular weight organic materials which can be coloured according to the invention are very generally polymers having a dielectric constant of $\geq 2.5$, especially polyester, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Polyester and polyamide are especially preferred. Very special preference is given to linear aromatic polyesters obtainable by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBTP); also polycarbonates, e.g. those obtained from $\alpha,\alpha$-dimethyl-4,4-dihydroxy-diphenylmethane and phosgene, or polymers based on polyvinyl chloride and on polyamide, e.g. polyamide-6 or polyamide-6.6.

The azo dyes according to the invention impart to the above-mentioned materials, especially to polyester and polyamide materials, tinctorially strong colour shades having very good in-use fastness properties, especially good light fastness.

The present invention relates also to an aqueous wood stain comprising at least one azo dye of formula (1).

For the aqueous wood stain according to the invention, preference is given to azo dyes of formula (1) in which the cation $M^+$ is $Na^+$, $K^+$, $NH_4^+$, ethanolammonium, $\frac{1}{2}Mg^{2+}$ or $\frac{1}{2}Ca^{2+}$, especially $Na^+$ or $K^+$.

The present invention relates also to a purely solvent-containing wood stain comprising at least one azo dye of formula (1).

A purely solvent-containing wood stain is to be understood as being a wood stain that comprises less than 5% by weight, preferably less than 1% by weight, water.

The purely solvent-containing wood stain comprises organic solvents, e.g. glycols, polyglycols, ketones, such as isobutyl methyl ketone, glycol ethers, carboxylic acid esters, such as ethyl acetate, butyl acetate, and especially alcohols, more especially $C_1$–$C_4$ alcohols.

For the purely solvent-containing wood stain according to the invention, preference is given to azo dyes of formula (1) in which the cation $M^+$ is 18 crown 6 $Na^+$ or $N(R_8)_4^+$, wherein the substituents $R_8$ are each independently of the others hydrogen or $C_1$–$C_{16}$alkyl, or is a phosphonium salt.

The wood stains according to the invention can also comprise further additives, e.g. UV absorbers, fungicides or insecticides. Examples of UV absorbers which may be mentioned are the UV absorbers of the benzotriazole, 2-hydroxybenzophenone, 2-hydroxy-1,3,5-triazine and oxanilide series. There may be mentioned as examples of fungicides 1-chloronaphthalene and pentachlorophenol. Examples of insecticides which may be mentioned are DDT, cypermethrin, propiconazole and parathion.

The aqueous wood stain may also comprise organic solvents, especially glycols, polyglycols, ketones or glycol ethers, and more especially alcohols.

Wood that can be coloured using the azo dye of formula (1) according to the invention is to be understood as being primarily shaped articles of wood having substantial surfaces, for example wooden boards, plywood and chipboard panels, which may be veneered, carved wooden objects, and also wooden parts which have been glued, nailed or screwed together to form furniture, for example, but also wood in finely divided form, for example wood chips or sawdust. Also suitable for the process according to the invention are thin wooden sheets which are produced by the continuous peeling of tree trunks and are joined together, e.g. bonded, to form thicker sheets or workpieces only after they have been coloured.

The treatment of the wood to be coloured can be carried out, for example, by treating the wood to be coloured directly with a wood stain comprising an azo dye of formula (1) and optionally a dye stabiliser.

The application of the wood stains according to the invention to the wood is carried out by customary methods, for example by immersing the wood in a bath of the wood stain, by brushing, spraying or by doctor blade application. The duration of contact can be up to several hours, the temperature of the wood stain bath generally being from 20 to about 110° C.

When the treatment is complete, the wooden objects are generally dried in air at room temperature. However, the treated wood can also be dried at elevated temperatures of up to about 100° C., for example in an air-circulating drying cabinet.

The wood stains according to the invention can be used to treat all customary woods, e.g. pine, spruce, fir, oak, ash, beech, maple, walnut, pear-wood, teak, mahogany, chestnut, birch, larch, hazel, lime, willow, poplar, elm, Scots pine, plane, obeche or aspen.

The present invention relates also to the woods treated with the azo dyes of formula (1) according to the invention.

The azo dyes of formula (1) according to the invention can also be used in the printing of semi-synthetic and, especially, synthetic hydrophobic fibre materials, more especially textile materials. Textile materials composed of blends that contain such semi-synthetic or synthetic hydrophobic fibre materials can likewise be printed using the azo dyes according to the invention.

Semi-synthetic textile materials that come into consideration are especially cellulose 2½-acetate and cellulose triacetate.

Synthetic hydrophobic textile materials consist especially of linear, aromatic polyesters, for example polyesters of terephthalic acid and glycols, especially ethylene glycol, or condensation products of terephthalic acid and 1,4-bis(hydroxymethyl)cyclohexane; of polycarbonates, e.g. polycarbonates obtained from α,α-dimethyl-4,4'-dihydroxy-diphenylmethane and phosgene, and of fibres based on polyvinyl chloride and on polyamide.

The azo dyes according to the invention are also highly suitable for the printing of polyester/wool and polyester/cellulosic fibre blends.

The said textile material can be in a variety of processing forms, e.g. in the form of fibres, yarns or non-wovens, in the form of woven fabrics or knitted fabrics.

It is advantageous to convert the azo dyes according to the invention into a dye preparation prior to use. For this purpose, the dye is ground so that its particle size is on average from 0.1 to 10 microns. Grinding can be carried out in the presence of dispersants. For example, the dried dye is ground with a dispersant or is kneaded into paste form with a dispersant and then dried in vacuo or by atomisation. The preparations so obtained can be used, after the addition of water, to prepare printing pastes.

The amount of dyes to be added to the printing pastes is dependent on the desired tinctorial strength; in general, amounts of from 0.01 to 15% by weight, especially from 0.02 to 10% by weight, based on the material to be printed, have proved suitable.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The printing pastes also comprise, if desired, acid donors, such as butyrolactone or sodium hydrogen phosphate, preservatives, sequestering agents, emulsifiers, organic solvents, e.g. alcohols, esters, toluene and xylene, binders, e.g. nitrocellulose and vinyl copolymers, softeners, e.g. citric add, oxidising agents, deaerating agents, light stabilisers and UV stabilisers.

For printing, the printing paste is applied directly to the entire surface of the material to be printed or to parts thereof, printing machines of the customary type, e.g. intaglio, rotary or flat-film printing machines, advantageously being used. The printing pastes according to the invention are also suitable for transfer printing.

The azo dyes according to the invention can also be used successfully in the preparation of printing pastes optionally together with other dyes.

The azo dyes according to the invention impart to the mentioned materials, especially to polyester materials, level colour shades having very good in-use fastness properties, especially good fastness to light.

The present invention relates also to the above-mentioned uses of the azo dyes according to the invention, and to a process for printing semi-synthetic or synthetic hydrophobic fibre material, especially textile material, in which the azo dyes according to the invention are applied to the mentioned material. The mentioned hydrophobic fibre material is preferably textile polyester material. Further substrates which can be treated by the process according to the invention, and preferred process conditions, are to be found hereinbefore in the more detailed explanation of the use of the azo dyes according to the invention.

The invention relates also to the hydrophobic fibre material, especially polyester textile material, printed by the mentioned process.

The azo dyes of formula (1) according to the invention are additionally suitable for modern recording processes, for example thermal transfer printing or ink-jet printing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimeters.

EXAMPLE 1

75.8 parts of 4-aminoazobenzene-3,4'-disulfonic acid are dissolved in 800 ml of deionised water at 50° C. The solution is then cooled to 10° C. and acidified with 25 ml of hydrochloric acid (37%), and 150 g of ice are added thereto. 51 ml of sodium nitrite solution (4M) is added to that solution in the course of 30 minutes at 5° C. and a pH of about 0.8. After a further 15 minutes, 4 ml of aminosulfonic acid (1M) are added and the pH is neutralised to 6 with sodium hydrogen carbonate.

44.6 parts of cyanomethyl-benzimidazolopyridone (coupling component) are introduced into 1000 ml of ethanol (50%) at 60° C. The pH is raised to 9 with NaOH (30%) and the mixture is stirred until a fine suspension forms. This is filtered, and the residue is washed twice with 25 ml of ethanol and deionised water each time.

The solution of the coupling component (60° C.) is added dropwise to the diazonium salt solution in the course of 90 minutes, with stirring, the temperature of the solution being maintained at 10° C. and the pH at about 6. After a further hour, the solution is allowed to come slowly to room temperature. The reaction is complete after a further 4 hours. The residue is filtered off with suction, washed three times with 50 ml of sodium chloride solution (5%) each time and dried in vacuo (100 mbar) at 90° C. There are obtained 138 parts of a salt-containing formulation which comprises 90 parts of the compound of formula

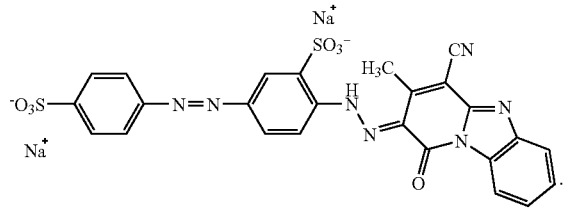

(13)

EXAMPLE 1A 75.8 parts of 4-aminoazobenzene-3,4'-disulfonic acid are dissolved in 800 ml of deionised water at 50° C. The solution is then cooled to 10° C. and acidified with 25 ml of hydrochloric acid (37%), and 150 g of ice are added thereto. 51.1 ml of a sodium nitrite solution (4M) are added to that solution in the course of 30 minutes at 5° C. and a pH of about 0.8. After a further 15 minutes, 4 ml of aminosulfonic add (1M) are added and the pH is adjusted to 6 with sodium hydrogen carbonate.

44.6 parts of cyanomethyl-benzimidazolopyridone (coupling component) are introduced into 1200 ml of deionised water at 60° C. The pH is raised to 11.5 with a 30% aqueous potassium hydroxide solution, and the mixture is stirred until a clear solution forms, which is then filtered.

The solution of the coupling component (60° C.) is added dropwise to the diazonium salt solution in the course of 90 minutes, with stirring, the temperature of the solution being maintained at 10° C. and the pH at about 7. After a further hour, the solution is allowed to come slowly to room temperature, and 50.0 parts of NaCl are added to the solution. The residue is filtered off with suction, washed three times with 50 ml of sodium chloride solution (5%) each time and dried in vacuo (100 mbar) at 90° C. There are obtained 130 parts of a salt-containing formulation which comprises 114 parts of the compound of formula

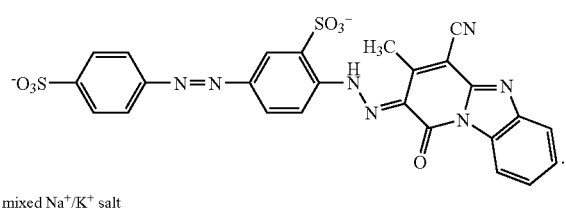

(14)

mixed Na⁺/K⁺ salt

EXAMPLE 2

22.4 parts of the product from Example 1 are introduced into 1800 ml of water, and the mixture is then heated to 80° C. The solution is filtered over a paper filter, and 19.6 parts of tetrabutylammonium bromide and 1800 ml of isobutyl methyl ketone are then added thereto with vigorous stirring. The pH is adjusted to about 3.8 with formic acid, and the organic phase is then separated off. It is filtered over activated carbon and then the solvent is removed in a rotary evaporator. 30.8 parts of a red compound of formula (10) are obtained.

EXAMPLE 3

3.66 parts of 2,4-dinitroaniline are dissolved in 20 ml of sulfuric acid (conc.) and heated to 30° C. There are slowly added dropwise to the solution 20 ml of glacial acetic acid (99%), while cooling with ice, and then 6.35 parts of nitrosylsulfuric acid (40%), during which the temperature should not exceed 15° C. The resulting solu-tion is stirred for one hour at room temperature, then 6.49 parts of sulfo-cyanomethyl-benzimidazole-pyridone sodium salt in 8 ml of glacial acetic add (99%) are added to the solution, while cooling externally with ice, and stirring is carried out for a further 5 hours at room temperature. The solution is then poured onto 300 ml of ice, and the scarlet-red precipitate is filtered off with suction over a glass fibre filter and dried in vacuo (100 mbar) at 60° C. The product so obtained is then converted into the tetrabutylammonium salt in the manner described in Example 2. There are obtained 1.03 parts of a scarlet-red compound of formula

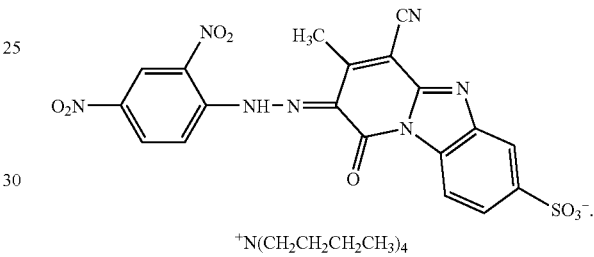

(15)

EXAMPLES 4–65

The compounds listed in the following Tables 1 to 4 can also be prepared in the indicated shades according to the processes described in Examples 1, 1A, 2 and 3.

TABLE 1

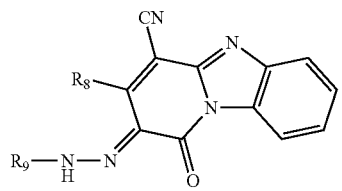

| Ex. | R₈ | R₉ | Cation | Shade |
|---|---|---|---|---|
| 4 | Methyl | ![OCH3 substituted benzene with -O3S, -SO3, methyl] | N⁺[(CH₂)₃CH₃]₄ | scarlet |
| 5 | Methyl | ![OCH3 substituted benzene with -O3S, -SO3, methyl] | Primene 81H⁺ | scarlet |

TABLE 1-continued
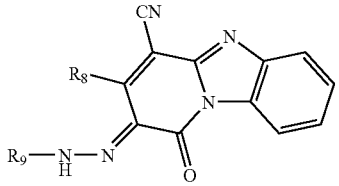
| Ex. | R8 | R9 | Cation | Shade |
|---|---|---|---|---|
| 6 | Methyl | 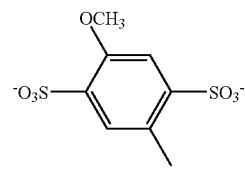 | N⁺(C₁₆H₃₃)(CH₃)₃ | scarlet |
| 7 | Methyl | 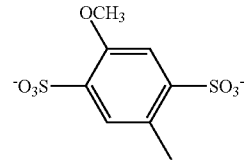 | N⁺(C₁₀H₂₁)₂(CH₃)₂ | scarlet |
| 8 | isopropyl | 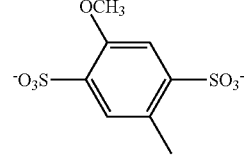 | Primene 81H⁺ | orange |
| 9 | methyl | 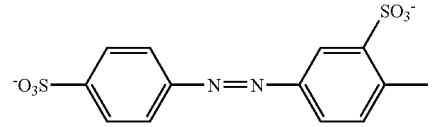 | Primene 81H⁺ | red |
| 10 | methyl | 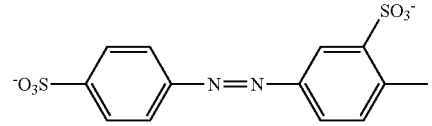 | N⁺[(CH₂)₃CH₃]₄ | red |
| 11 | phenyl | 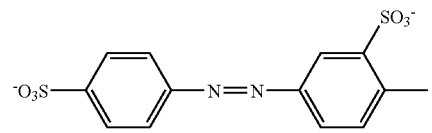 | N⁺[(CH₂)₃CH₃]₄ | red |
| 12 | methyl | 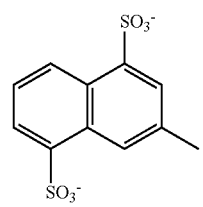 | Primene 81H⁺ | scarlet |
| 13 | methyl | 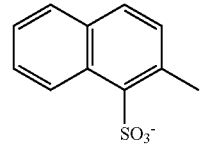 | N⁺[(CH₂)₃CH₃]₄ | orange |

TABLE 1-continued
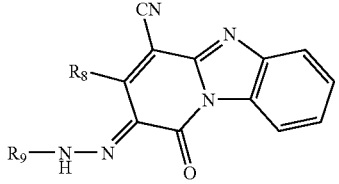
| Ex. | R$_8$ | R$_9$ | Cation | Shade |
|---|---|---|---|---|
| 14 | methyl | 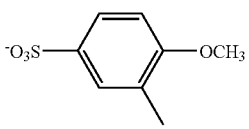 | Primene 81H$^+$ | scarlet |
| 15 | methyl | 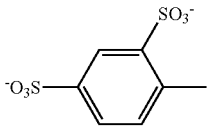 | Primene 81H$^+$ | orange |
| 16 | methyl | 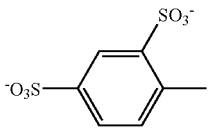 | N$^+$[(CH$_2$)$_3$CH$_3$]$_4$ | orange |
| 17 | methyl | 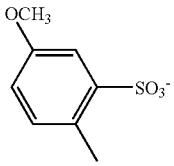 | N$^{30}$(C$_{10}$H$_{21}$)$_2$(CH$_3$)$_2$ | scarlet |
| 18 | phenyl | 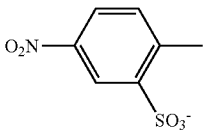 | N$^+$(C$_{10}$H$_{21}$)$_2$(CH$_3$)$_2$ | orange |
| 19 | methyl | 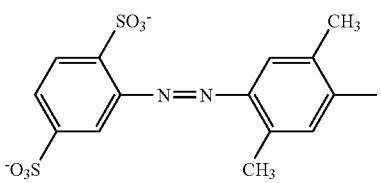 | N$^+$[(CH$_2$)$_3$CH$_3$]$_4$ | violet |
| 20 | methyl | 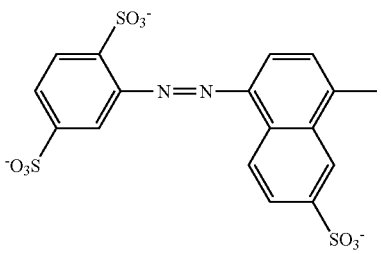 | N$^+$[(CH$_2$)$_3$CH$_3$]$_4$ | red |

TABLE 1-continued

| Ex. | R₈ | R₉ | Cation | Shade |
|---|---|---|---|---|
| 21 | methyl | [2-sulfonatophenyl-azo-4-methyl-7-sulfonato-naphthyl] | $N^+[(CH_2)_3CH_3]_4$ | violet |
| 22 | methyl | [4-methyl-2-sulfonatophenyl-CH=CH-2-sulfonato-4-methylphenyl] | Primene 81H⁺ | violet |
| 23 | methyl | [4-sulfonatophenyl-azo-3-sulfonato-4-methylphenyl] | Primene 81H⁺ | red |
| 24 | methyl | [4-sulfonatophenyl-azo-3-sulfonato-4-methylphenyl] | $N^+[(CH_2)_3CH_3]_4$ | red |
| 25 | phenyl | [4-sulfonatophenyl-azo-3-sulfonato-4-methylphenyl] | $N^+[(CH_2)_3CH_3]_4$ | red |
| 26 | methyl | [4-sulfonatophenyl-azo-3-sulfonato-4-methylphenyl] | protonated 1,5,7-triazabicyclo[4.4.0] | red |
| 27 | methyl | [4-sulfonatophenyl-azo-3-sulfonato-4-methylphenyl] | N,N'-diphenylguanidinium | red |
| 28 | methyl | [4-sulfonatophenyl-azo-3-sulfonato-4-methylphenyl] | $(CH_3)_2N-C(=N^+H-C(CH_3)_3)-N(CH_3)_2$ | red |

TABLE 1-continued

| Ex. | R₈ | R₉ | Cation | Shade |
|-----|-----|-----|--------|-------|
| 29 | methyl | (4-sulfonatophenyl-azo)-2-methyl-5-sulfonatophenyl | $CH_2(CH_2)_3-CH(C_2H_5)-CH_2-N^+H_2-CH_2CH(C_2H_5)-(CH_2)_3CH_3$ | red |
| 30 | p-methoxyphenyl | (4-sulfonatophenyl-azo)-2-methyl-5-sulfonatophenyl | $N^+[(CH_2)_3CH_3]_4$ | red |
| 31 | methyl | (4-sulfonatophenyl-azo)-2-methyl-5-sulfonatophenyl | $(CH_3)_2N-C(=N^+H_2)-N(CH_3)_2$ | red |
| 32 | methyl | (4-sulfonatophenyl-azo)-2-methyl-5-sulfonatophenyl | 18 crown 6 $Na^+$ | red |
| 33 | $CF_3$ | (4-sulfonatophenyl-azo)-2-methyl-5-sulfonatophenyl | $N^+[(CH_2)_3CH_3]_4$ | scarlet |
| 34 | methyl | 4-methyl-5-(phenylsulfonyloxy)-2,7-disulfonatonaphthyl | $N^+[(CH_2)_3CH_3]_4$ | red |
| 35 | methyl | (4-sulfonatophenyl-azo)-2-methoxy-4-methyl-5-sulfonatophenyl | $Na^+$ | red |
| 36 | methyl | (4-sulfonatophenyl-azo)-2-methoxy-4-methyl-5-sulfonatophenyl | $K^+/Na^+$ | red |

TABLE 1-continued
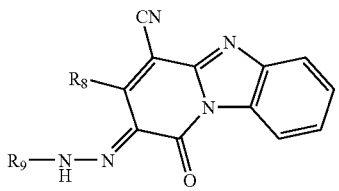
| Ex. | R₈ | R₉ | Cation | Shade |
|---|---|---|---|---|
| 37 | methyl | 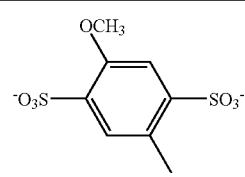 | Na⁺ | scarlet |
| 38 | phenyl | 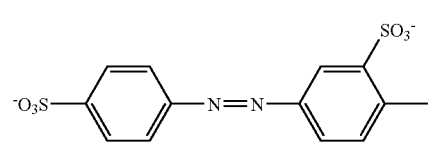 | Na⁺ | red |
| 38a | phenyl | 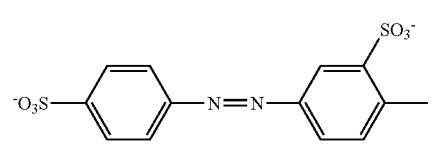 | Na⁺/K⁺ | red |
| 39 | methyl | 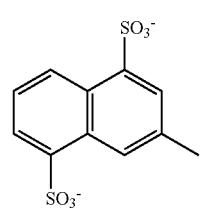 | Na⁺ | scarlet |
| 40 | methyl | 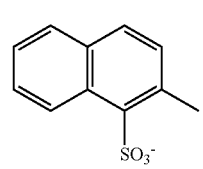 | Na⁺ | orange |
| 41 | methyl | 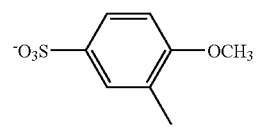 | Na⁺ | scarlet |
| 42 | methyl | 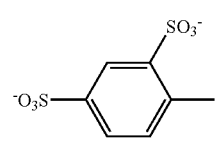 | Primene 81H⁺ | orange |
| 43 | methyl | 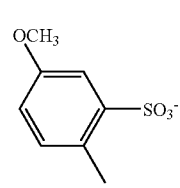 | Na⁺ | scarlet |

TABLE 1-continued

[Structure: benzimidazole-fused pyridinone with CN group, R8 substituent, and R9-NH-N= hydrazone]

| Ex. | R8 | R9 | Cation | Shade |
|-----|-----|-----|--------|-------|
| 44 | phenyl | 4-methyl-3-sulfo-nitrophenyl (O₂N-, -SO₃⁻, CH₃ substituents) | K⁺/Na⁺ | orange |
| 45 | methyl | 2,5-disulfophenyl-azo-2,5-dimethylphenyl | Na⁺ | violet |
| 46 | methyl | 2,5-disulfophenyl-azo-(4-methyl-7-sulfonaphthyl) | Na⁺ | red |
| 47 | methyl | 2-sulfophenyl-azo-(4-methyl-7-sulfonaphthyl) | K⁺/Na⁺ | violet |
| 48 | methyl | 4-methyl-2-sulfophenyl-CH=CH-4-methyl-2-sulfophenyl (stilbene) | K⁺/Na⁺ | violet |
| 49 | methyl | 4-sulfophenyl-azo-(4-methyl-3-sulfophenyl) | Na⁺ | red |
| 50 | methyl | phenylsulfonyloxy-(8-methyl-3,6-disulfo-naphthyl) | K⁺/Na⁺ | red |

TABLE 2
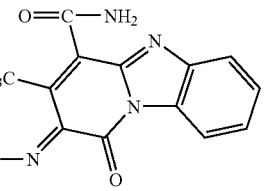
| Ex. | R₁₀ | Cation | Shade |
|---|---|---|---|
| 51 | 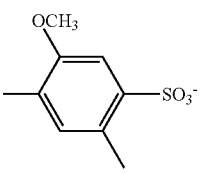 | Primene 81H⁺ | orange |
| 52 | 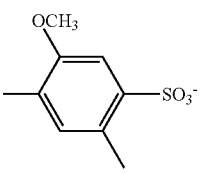 | Primene 81H⁺ | orange |
| 53 | 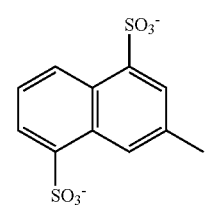 | Na⁺ | violet |
| 54 | 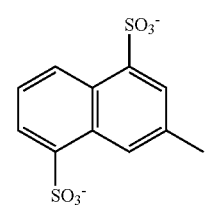 | N⁺[(CH₂)₃CH₃]₄ | red |
TABLE 3
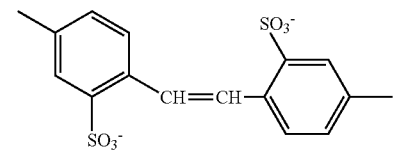
| Ex. | R₁₁ | Cation | Shade |
|---|---|---|---|
| 55 | 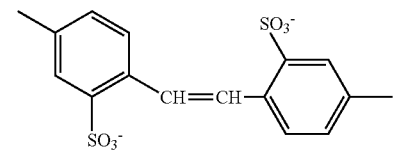 | Primene 81H⁺ | scarlet |
| 56 | 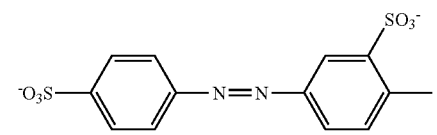 | Primene 81H⁺ | orange |

TABLE 3-continued
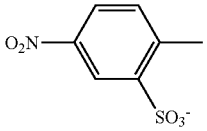
| Ex. | R₁₁ | Cation | Shade |
|---|---|---|---|
| 57 | 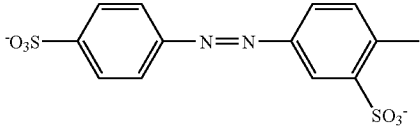 | $N^+[(CH_2)_3CH_3]_4$ | red-tinged yellow |
| 58 | 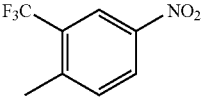 | $N^+[(CH_2)_3CH_3]_4$ | scarlet |
| 59 | 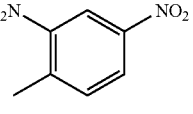 | $N^+[(CH_2)_3CH_3]_4$ | orange |
| 60 | 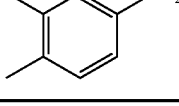 | $N^+[(CH_2)_3CH_3]_4$ | orange |
| 61 | 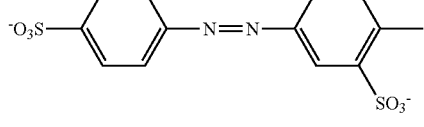 | $K^+$ | orange |
TABLE 4
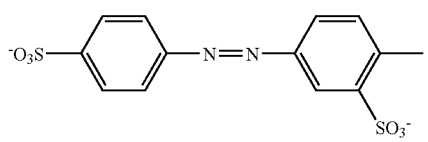
| Ex. | R₈ | R₉ | Cation | Shade |
|---|---|---|---|---|
| 62 | methyl | (-O₃S-phenyl-N=N-phenyl(CH₃)(SO₃⁻)) | $Na^+$ | red |
| 63 | methyl | (-O₃S-phenyl-N=N-phenyl(CH₃)(SO₃⁻)) | $N^+[(CH_2)_3CH_3]_4$ | orange |

TABLE 4-continued

| Ex. | R$_8$ | R$_9$ | Cation | Shade |
|---|---|---|---|---|
| 64 | methyl | (naphthalene with SO$_3^-$, SO$_3^-$, CH$_3$) | Na$^+$ | red |
| 65 | methyl | (naphthalene with SO$_3^-$, SO$_3^-$, CH$_3$) | N$^+$[(CH$_2$)$_3$CH$_3$]$_4$ | orange |

Example of a Purely Solvent-containing Wood Stain:
3.0 parts by weight of the azo dye of formula (10),
40.0 parts by weight of ethyl alcohol,
40.0 parts by weight of 1 methoxy-2-propanol and
17.0 parts by weight of isopropanol Example of an Aqueous Wood Stain:
3.0 parts by weight of the azo dye of the formula

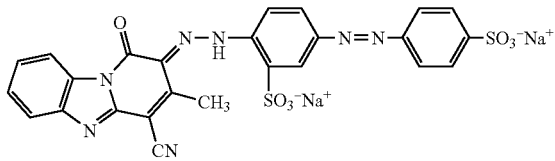

are dissolved in 100.0 ml of water containing 0.05% by weight Invadin® LU (a wetting agent).

The wood stains obtained according to the above Examples are applied by means of a brush to a 10×5.5 cm piece of ash wood. The coloured piece of wood is dried in air for 12 hours.

What is claimed is:

1. An azo dye of formula (1)

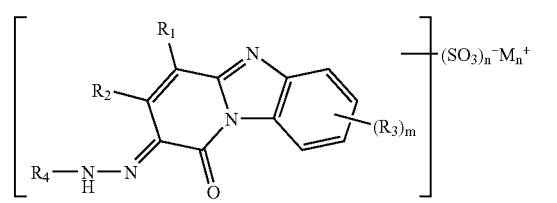

wherein
R$_1$ is —CN, —COOR$_5$, —CONR$_6$R$_7$ or a heterocyclic ring, R$_2$ is unsubstituted or substituted alkyl, unsubstituted or substituted aryl, —CF$_3$, —COOR$_5$, —CONR$_6$R$_7$ or —COR$_5$, R$_3$ is hydrogen, —SO$_3$M, alkyl, alkoxy, alkylcarbonyl, —NO$_2$ or halogen, R$_4$ is substituted aryl, substituted heteroaryl or an aryl-N=N-aryl radical, wherein one or both of the aryl radicals in aryl-N=N-aryl is/are unsubstituted or substituted, or a radical heteroaryl-N=N-heteroaryl, wherein one or both of the heteroaryl radicals in heteroaryl-N=N-heteroaryl is/are unsubstituted or substituted, R$_5$ is hydrogen, alkyl or unsubstituted or substituted aryl, R$_6$ is hydrogen, alkyl or unsubstituted or substituted aryl, R$_7$ is hydrogen, alkyl or unsubstituted or substituted aryl,
M$^+$ is a phosphonium salt or N(R$_8$)$_4^+$, wherein the substituents R$_8$ are each independently of the other hydrogen, C$_1$–C$_{16}$alkyl or C$_1$–C$_4$ alcohol
n is a number 1, 2 or 3 and m is a number 1, 2 or 3,
and when n is a number 2 or 3, each M$^+$ can be the same or different.

2. An azo dye according to claim 1, wherein R$_1$ is —CN or —CONH$_2$.

3. An azo dye according to either claim 1, wherein R$_2$ is methyl, isopropyl, —CF$_3$, phenyl or p-methoxyphenyl.

4. An azo dye according to claim 1, wherein R$_3$ is hydrogen, chlorine or —SO$_3$M.

5. An azo dye according to claim 1, wherein R$_4$ is phenyl substituted by methyl and/or by methoxy and/or by —NO$_2$ and/or by —CF$_3$ and/or one or more times by —SO$_3$M, or is phenyl-N=N-phenyl, wherein one of the phenyl radicals or both phenyl radicals independently of one another is/are unsubstituted or substituted as indicated above.

6. An azo dye according to claim 1, wherein R$_4$ is naphthyl substituted one or more times by —SO$_3$M.

7. An azo dye according to claim 1, wherein the cation M⁺ is Primene 81, N⁺[(CH₂)₃CH₃]₄, N⁺(C₁₆H₃₃)(CH₃)₃ or N⁺(C₁₀H₂₁)₂(CH₃)₂.

8. An azo dye according to claim 1 of formula

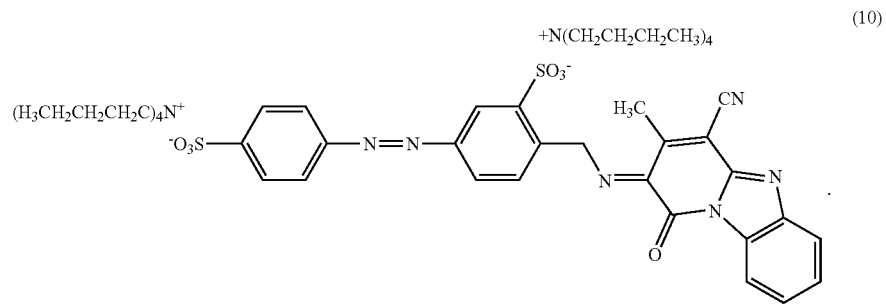
(10)

9. An azo dye according to claim 1 of formula

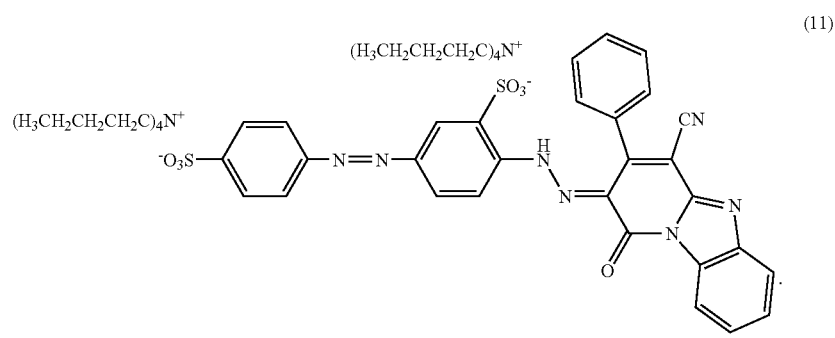
(11)

10. An azo dye according to claim 1 of formula

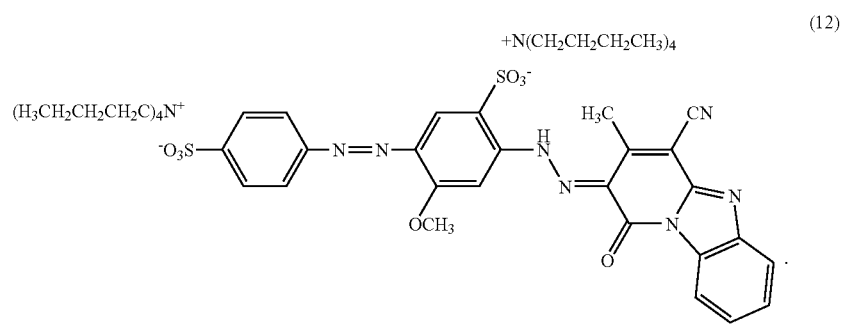
(12)

11. A process for the production of coloured plastics or polymeric colour particles, in which one or more azo dyes of formula (1) according to claim 1 is/are incorporated into those materials.

12. The coloured plastics or polymeric colour particles according to claim 11.

13. An aqueous wood stain comprising an azo dye of formula (1) according to claim 1.

14. A process for colouring wood, in which an aqueous wood stain according to claim 13 is used.

15. Wood coloured according to claim 14.

16. A purely solvent-containing wood stain comprising an azo dye of formula (1) according to claim 1.

17. A process for colouring wood, in which a purely solvent-containing wood stain according to claim 16 is used.

18. Wood coloured according to claim 17.

19. A process for dyeing or printing semi-synthetic or synthetic hydrophobic fiber material, in which one or more azo dyes according to claim 1 is/are applied to the hydrophobic fiber material or incorporated therein.

20. A process according to claim 19, in which the hydrophobic fiber material consists of polyester fibers.

* * * * *